(12) United States Patent
Kordel et al.

(10) Patent No.: US 7,611,099 B2
(45) Date of Patent: Nov. 3, 2009

(54) SEAL ASSEMBLIES FOR USE WITH DROOPED SPOILERS AND OTHER CONTROL SURFACES ON AIRCRAFT

(75) Inventors: Jan A. Kordel, Seattle, WA (US); Seiya Sakurai, Seattle, WA (US); Bret A. Bowers, Seattle, WA (US); Christopher G. Glassmoyer, Seattle, WA (US); Darren B. Williams, Seattle, WA (US)

(73) Assignee: The Boeing Company, Chicago, IL (US)

( * ) Notice: Subject to any disclaimer, the term of this patent is extended or adjusted under 35 U.S.C. 154(b) by 442 days.

(21) Appl. No.: 11/220,446

(22) Filed: Sep. 7, 2005

(65) Prior Publication Data
US 2007/0252040 A1    Nov. 1, 2007

(51) Int. Cl.
*B64C 3/50* (2006.01)
(52) U.S. Cl. .................... 244/215; 244/213; 244/214; 244/131; 277/644; 277/645; 277/647; 277/916
(58) Field of Classification Search .............. 244/132, 244/213, 215, 216
See application file for complete search history.

(56) References Cited
U.S. PATENT DOCUMENTS

| | | |
|---|---|---|
| 1,770,575 A | 7/1930 | Ksoll |
| 2,086,085 A | 7/1937 | Lachmann et al. |
| 2,289,704 A * | 7/1942 | Grant ................... 244/225 |
| 2,387,492 A | 10/1945 | Blaylock et al. |
| 2,421,694 A | 6/1947 | Hawkins et al. |
| 2,422,296 A | 6/1947 | Flader et al. |
| 2,444,293 A | 6/1948 | Holt |
| 2,458,900 A | 1/1949 | Erny |
| 2,563,453 A | 8/1951 | Briend |

(Continued)

FOREIGN PATENT DOCUMENTS

EP    0 103 038    3/1984

(Continued)

OTHER PUBLICATIONS

U.S. Appl. No. 10/671,435, Kelley-Wickemeyer et al.

(Continued)

*Primary Examiner*—Michael R Mansen
*Assistant Examiner*—Philip J Bonzell
(74) *Attorney, Agent, or Firm*—Perkins Coie LLP

(57) ABSTRACT

Aerodynamic seals for use with control surfaces on aircraft are described herein. In one embodiment, a seal assembly for use with an aircraft includes a first seal member and a second seal member. The first seal member has a first proximal portion configured to be attached to a fixed airfoil portion of the aircraft, and a first distal portion configured to extend outwardly from the fixed airfoil portion toward a movable control surface. The second seal member has a second proximal portion configured to be attached to the movable control surface, and a second distal portion configured to extend outwardly from the control surface toward the fixed airfoil portion. In this embodiment, the second distal portion is further configured to movably contact the first distal portion to at least partially seal the gap between the fixed airfoil portion and the movable control surface as the control surface moves relative to the fixed airfoil portion.

18 Claims, 7 Drawing Sheets

U.S. PATENT DOCUMENTS

| | | |
|---|---|---|
| 2,652,812 A | 9/1953 | Fenzl |
| 2,665,084 A | 1/1954 | Feeney et al. |
| 2,864,239 A | 12/1958 | Taylor |
| 2,891,740 A | 6/1959 | Campbell |
| 2,892,312 A | 6/1959 | James et al. |
| 2,920,844 A | 1/1960 | Marshall et al. |
| 2,990,144 A | 6/1961 | Hougland |
| 2,990,145 A | 6/1961 | Hougland |
| 3,013,748 A | 12/1961 | Westburg |
| 3,102,607 A | 9/1963 | Roberts |
| 3,112,089 A | 11/1963 | Dornier |
| 3,136,504 A | 6/1964 | Carr |
| 3,243,126 A * | 3/1966 | Kurti et al. ............. 239/265.39 |
| 3,362,659 A | 1/1968 | Razak |
| 3,375,998 A | 4/1968 | Alvarez-Calderon |
| 3,447,763 A | 6/1969 | Allcock |
| 3,499,622 A * | 3/1970 | Surcin et al. ................ 244/130 |
| 3,504,870 A | 4/1970 | Cole et al. |
| 3,528,632 A | 9/1970 | Miles et al. |
| 3,556,439 A | 1/1971 | Autry et al. |
| 3,653,611 A | 4/1972 | Trupp et al. |
| 3,704,828 A | 12/1972 | Studer et al. |
| 3,704,843 A | 12/1972 | Jenny |
| 3,743,219 A | 7/1973 | Gorges |
| 3,767,140 A | 10/1973 | Johnson |
| 3,790,106 A | 2/1974 | Sweeney et al. |
| 3,794,276 A | 2/1974 | Maltby et al. |
| 3,827,658 A | 8/1974 | Hallworth |
| 3,831,886 A | 8/1974 | Burdges et al. |
| 3,836,099 A | 9/1974 | O'Neill et al. |
| 3,837,601 A | 9/1974 | Cole |
| 3,862,730 A | 1/1975 | Heiney |
| 3,910,530 A | 10/1975 | James et al. |
| 3,941,334 A | 3/1976 | Cole |
| 3,941,341 A | 3/1976 | Brogdon, Jr. |
| 3,954,231 A | 5/1976 | Fraser |
| 3,992,979 A | 11/1976 | Smith |
| 3,994,451 A | 11/1976 | Cole |
| 4,015,787 A | 4/1977 | Maieli et al. |
| 4,117,996 A | 10/1978 | Sherman |
| 4,120,470 A | 10/1978 | Whitener |
| 4,131,253 A | 12/1978 | Zapel |
| 4,146,200 A | 3/1979 | Borzachillo |
| 4,171,787 A | 10/1979 | Zapel |
| 4,189,120 A | 2/1980 | Wang |
| 4,189,121 A | 2/1980 | Harper et al. |
| 4,189,122 A | 2/1980 | Miller |
| 4,200,253 A | 4/1980 | Rowarth |
| 4,240,255 A | 12/1980 | Benilan |
| 4,262,868 A | 4/1981 | Dean |
| 4,275,942 A | 6/1981 | Steidl |
| 4,285,482 A | 8/1981 | Lewis |
| 4,293,110 A | 10/1981 | Middleton |
| 4,312,486 A | 1/1982 | McKinney |
| 4,351,502 A | 9/1982 | Statkus |
| 4,353,517 A | 10/1982 | Rudolph |
| 4,368,937 A | 1/1983 | Palombo |
| 4,384,693 A | 5/1983 | Pauly et al. |
| 4,427,168 A | 1/1984 | McKinney |
| 4,441,675 A | 4/1984 | Boehringer |
| 4,461,449 A | 7/1984 | Turner |
| 4,470,569 A | 9/1984 | Shaffer et al. |
| 4,471,927 A * | 9/1984 | Rudolph et al. ............. 244/215 |
| 4,475,702 A | 10/1984 | Cole |
| 4,485,992 A | 12/1984 | Rao |
| 4,496,121 A | 1/1985 | Berlin |
| 4,498,646 A | 2/1985 | Proksch |
| 4,528,775 A | 7/1985 | Einarsson |
| 4,533,096 A | 8/1985 | Baker et al. |
| 4,575,030 A | 3/1986 | Gratzer |
| 4,575,099 A | 3/1986 | Nash |
| 4,576,347 A | 3/1986 | Opsahl |
| 4,618,109 A * | 10/1986 | Victor ........................ 244/130 |
| 4,637,573 A | 1/1987 | Perin et al. |
| 4,650,140 A | 3/1987 | Cole |
| 4,669,687 A | 6/1987 | Rudolph |
| 4,700,911 A | 10/1987 | Zimmer |
| 4,702,441 A | 10/1987 | Wang |
| 4,706,913 A | 11/1987 | Cole |
| 4,712,752 A | 12/1987 | Victor |
| 4,717,097 A | 1/1988 | Sepstrup |
| 4,729,528 A | 3/1988 | Borzachillo |
| 4,784,355 A | 11/1988 | Brine |
| 4,786,013 A | 11/1988 | Pohl |
| 4,823,836 A | 4/1989 | Bachmann et al. |
| 4,856,735 A | 8/1989 | Lotz et al. |
| 4,899,284 A | 2/1990 | Lewis |
| 4,962,902 A * | 10/1990 | Fortes ........................ 244/215 |
| 5,046,688 A | 9/1991 | Woods |
| 5,050,081 A | 9/1991 | Abbott et al. |
| 5,074,495 A | 12/1991 | Raymond |
| 5,082,208 A | 1/1992 | Matich |
| 5,088,665 A | 2/1992 | Vijgen |
| 5,094,411 A | 3/1992 | Rao |
| 5,094,412 A | 3/1992 | Narramore |
| 5,098,043 A * | 3/1992 | Arena ........................ 244/215 |
| 5,100,082 A | 3/1992 | Archung |
| 5,114,100 A | 5/1992 | Rudolph |
| 5,129,597 A | 7/1992 | Manthey |
| 5,158,252 A | 10/1992 | Sakurai |
| 5,167,383 A | 12/1992 | Nozaki |
| 5,203,619 A | 4/1993 | Welsch |
| 5,207,400 A | 5/1993 | Jennings |
| 5,222,692 A * | 6/1993 | Glowacki ................ 244/53 R |
| 5,244,269 A | 9/1993 | Harriehausen |
| 5,259,293 A | 11/1993 | Brunner |
| 5,351,914 A | 10/1994 | Nagao |
| 5,388,788 A * | 2/1995 | Rudolph ..................... 244/215 |
| 5,441,218 A | 8/1995 | Mueller |
| 5,474,265 A | 12/1995 | Capbern |
| 5,535,852 A | 7/1996 | Bishop |
| 5,542,684 A | 8/1996 | Squirrell |
| 5,544,847 A | 8/1996 | Bliesner |
| 5,600,220 A | 2/1997 | Thoraval |
| 5,609,020 A | 3/1997 | Jackson |
| 5,680,124 A | 10/1997 | Bedell |
| 5,686,907 A | 11/1997 | Bedell |
| 5,743,490 A | 4/1998 | Gillingham |
| 5,788,190 A | 8/1998 | Siers |
| 5,875,998 A | 3/1999 | Gleine |
| 5,921,506 A | 7/1999 | Appa |
| 5,927,656 A | 7/1999 | Hinkleman |
| 5,934,615 A | 8/1999 | Treichler |
| 5,984,230 A | 11/1999 | Orazi |
| 6,015,117 A | 1/2000 | Broadbent |
| 6,045,204 A | 4/2000 | Frazier |
| 6,073,624 A | 6/2000 | Laurent |
| 6,076,767 A | 6/2000 | Farley et al. |
| 6,076,776 A | 6/2000 | Breitbach |
| 6,109,567 A | 8/2000 | Munoz |
| 6,161,801 A | 12/2000 | Kelm |
| 6,213,433 B1 | 4/2001 | Gruensfelder |
| 6,293,497 B1 | 9/2001 | Kelly-Wickemeyer et al. |
| 6,328,265 B1 | 12/2001 | Dizdarevic |
| 6,349,798 B1 | 2/2002 | McKay |
| 6,364,254 B1 | 4/2002 | May |
| 6,375,126 B1 | 4/2002 | Sakurai |
| 6,443,394 B1 | 9/2002 | Weisend |
| 6,484,969 B2 | 11/2002 | Sprenger |
| 6,499,577 B2 | 12/2002 | Kitamoto et al. |
| 6,547,183 B2 | 4/2003 | Farnsworth |
| 6,554,229 B1 | 4/2003 | Lam |
| 6,591,169 B2 | 7/2003 | Jones |
| 6,598,829 B2 | 7/2003 | Kamstra |

| | | | |
|---|---|---|---|
| 6,598,834 B2 | 7/2003 | Nettle | |
| 6,601,801 B1* | 8/2003 | Prow et al. | 244/216 |
| 6,622,972 B2 | 9/2003 | Urnes, Sr. et al. | |
| 6,625,982 B2 | 9/2003 | Van Den Bossche | |
| 6,644,599 B2 | 11/2003 | Perez | |
| 6,651,930 B1 | 11/2003 | Gautier et al. | |
| 6,729,583 B2* | 5/2004 | Milliere | 244/213 |
| 6,796,534 B2 | 9/2004 | Beyer et al. | |
| 6,799,739 B1 | 10/2004 | Jones | |
| 6,966,189 B2* | 11/2005 | Lapergue et al. | 60/771 |
| 7,051,982 B1* | 5/2006 | Johnson | 244/215 |
| 2003/0132860 A1 | 7/2003 | Feyereisen et al. | |
| 2004/0004162 A1* | 1/2004 | Beyer et al. | 244/216 |
| 2004/0059474 A1 | 3/2004 | Boorman et al. | |
| 2004/0245386 A1 | 12/2004 | Huynh | |
| 2008/0001036 A1 | 1/2008 | Voogt | |

FOREIGN PATENT DOCUMENTS

| | | |
|---|---|---|
| EP | 0 947 421 | 10/1999 |
| GB | 2 144 688 A | 3/1985 |
| WO | WO-2008051286 | 5/2008 |

OTHER PUBLICATIONS

U.S. Appl. No. 10/770,256, Speer et al.
U.S. Appl. No. 10/789,100, Lacy et al.
U.S. Appl. No. 10/868,234, Rampton et al.
U.S. Appl. No. 10/868,238, Dun.
U.S. Appl. No. 10/935,846, Good et al.
U.S. Appl. No. 10/955,686, Wheaton et al.
U.S. Appl. No. 10/959,629, Jones et al.
U.S. Appl. No. 11/048,320, Konings et al.
U.S. Appl. No. 11/051,738, Huynh et al.
U.S. Appl. No. 11/116,905, Good et al.
U.S. Appl. No. 60/475,828, Borzachillo.
777 High Lift System, 777 Maintenance Manual, Publication Date: Circa 1994 (1 page).
777 Transmission—Typical, 777 Maintenance Manual, Publication Date: Circa 1994 (1 page).
A320 Hinterkantem-Klappen-Verstell System, Trailing Edge Flap System, SAE Presentation, Publication Date: Circa 1990 (1 page).
A340 Flight Controls, SAE Presentation, Publication Date: Circa 1995 (1 page).
Boeing, 777 Aircraft Maintenance Manual, Sep. 5, 2002 (p. 39).
Drela, M., "Optimization Techniques In Airfoil Design," MIT Aero & Astro, 29 pages.
Drela, Mark, "Design and Optimization Method for Multi-Element Airfoils," MIT Department of Aeronautics and Astronautics, Copyright 1993 American Institute of Aeronautics and Astronautics, Inc. (pp. 1-11).
Flap Drive System, 777 Maintenance Manual, Publication Date: Circa 1994 (1 page).
Flap Transmission and Support, 777 Maintenance Manual, Publication Date: Circa 1994 (1 page).
Hansen, H., "Application of Mini-Trailing-Edge Devices in the Awiator Project," Airbus Deutschland, EGAG, Hunefeldstr. 1-5, D-28199 Bremen, Germany, 9 pages.
Junkers JU 52/3M (2 pages); http://www.wpafb.af.mil/museum/outdoor/od16; [Accessed Aug. 7, 2003].
Moog, Component Maintenance Manual, May 1994 (2 pages).
Niu, Chen-Yen, Airframe Structural Design, Chen-Yeun Niu, Conmilit Press, 1988 (1 page).
Petrov, A.V., "Certain Types of Separated Flow over Slotted Wings," Fluid Mechanics—Soviet Research, vol. 7, No. 5, Sep.-Oct. 1978, pp. 80-89.
The High Speed Frontier, Chapter 2: The High-Speed Airfoil Program, "Supercritical" Airfoils, 1957-1978 (4 pages); http://www.hq.nasa.gov/office/pao/History/SP-445/ch2-5.
TU-144 Canard, 1 pg, (date unknown).
Whitcomb, Richard T., "Review of NASA Supercritical Airfoils," National Aeornautics and Space Administration, Aug. 1974 (pp. 8-18).
Leaf Spring Retainer Seals, EPM, Inc., Apr. 27, 2005 (2 pgs).
U.S. Appl. No. 11/453,596, filed Jun. 14, 2006, Fox et al.
U.S. Appl. No. 11/966,361, filed Dec. 28, 2007, Huynh et al.
U.S. Appl. No. 12/264,831, filed Nov. 4, 2008, Lacy et al.
U.S. Appl. No. 12/331,193, filed Dec. 9, 2008, Beyer.
U.S. Appl. No. 12/352,447, filed Jan. 12, 2009, Good et al.
"Aero-Space Research & Technology," Space Systems, Sep. 1, 2001, pp. 1-28.
"Morphing Aircraft Structures,"-Penn State University, www.personal.psu.edu/users/d/s/dsr134/mas/Cellular.htm, pp. 1-3.
Morphing Systems, "Morphing Aerostructures—An Overview," www.crgrp.net/morphingsystems.htm, pp. 1-9; (accessed Aug. 31, 2005).

* cited by examiner

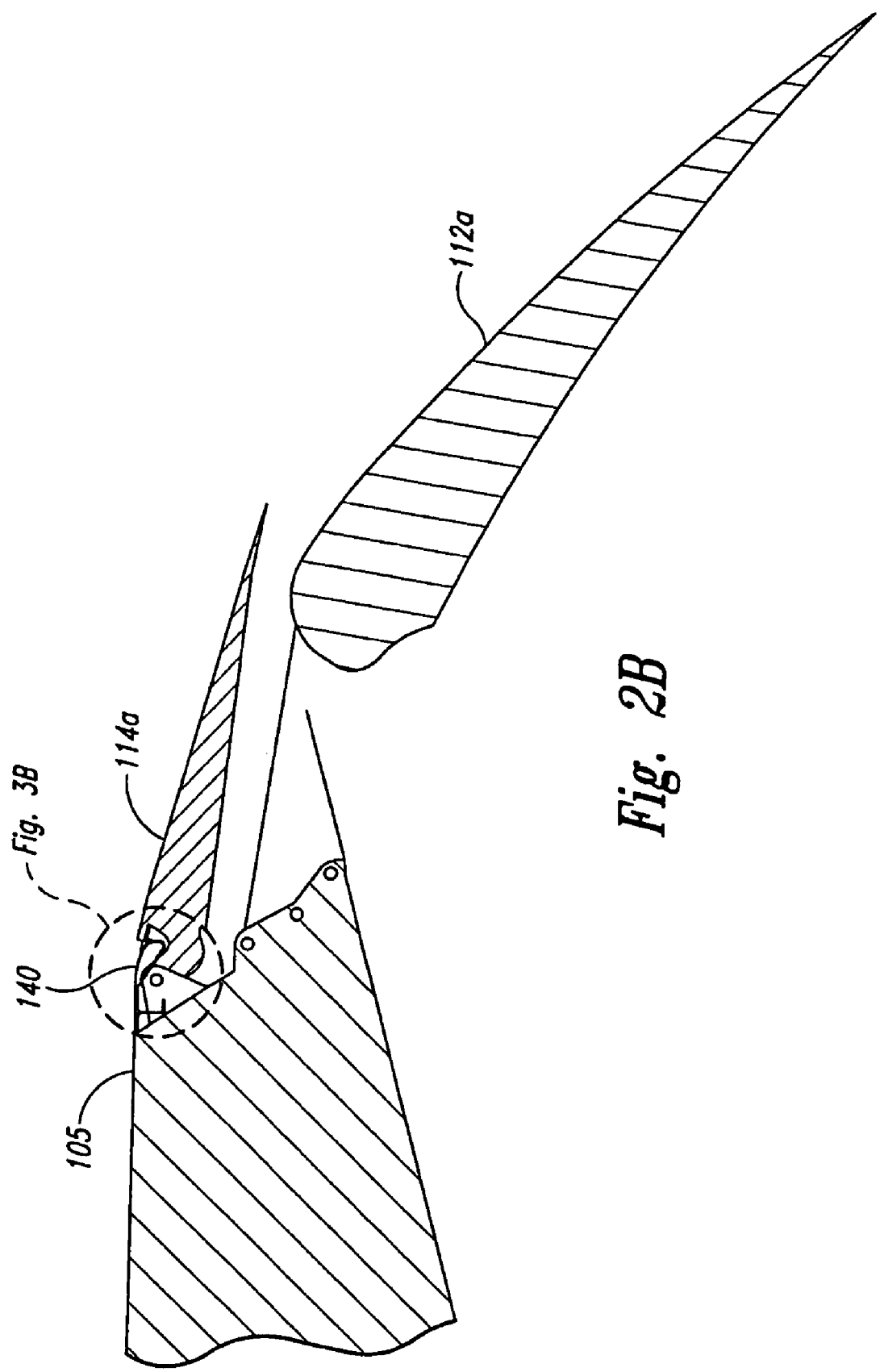

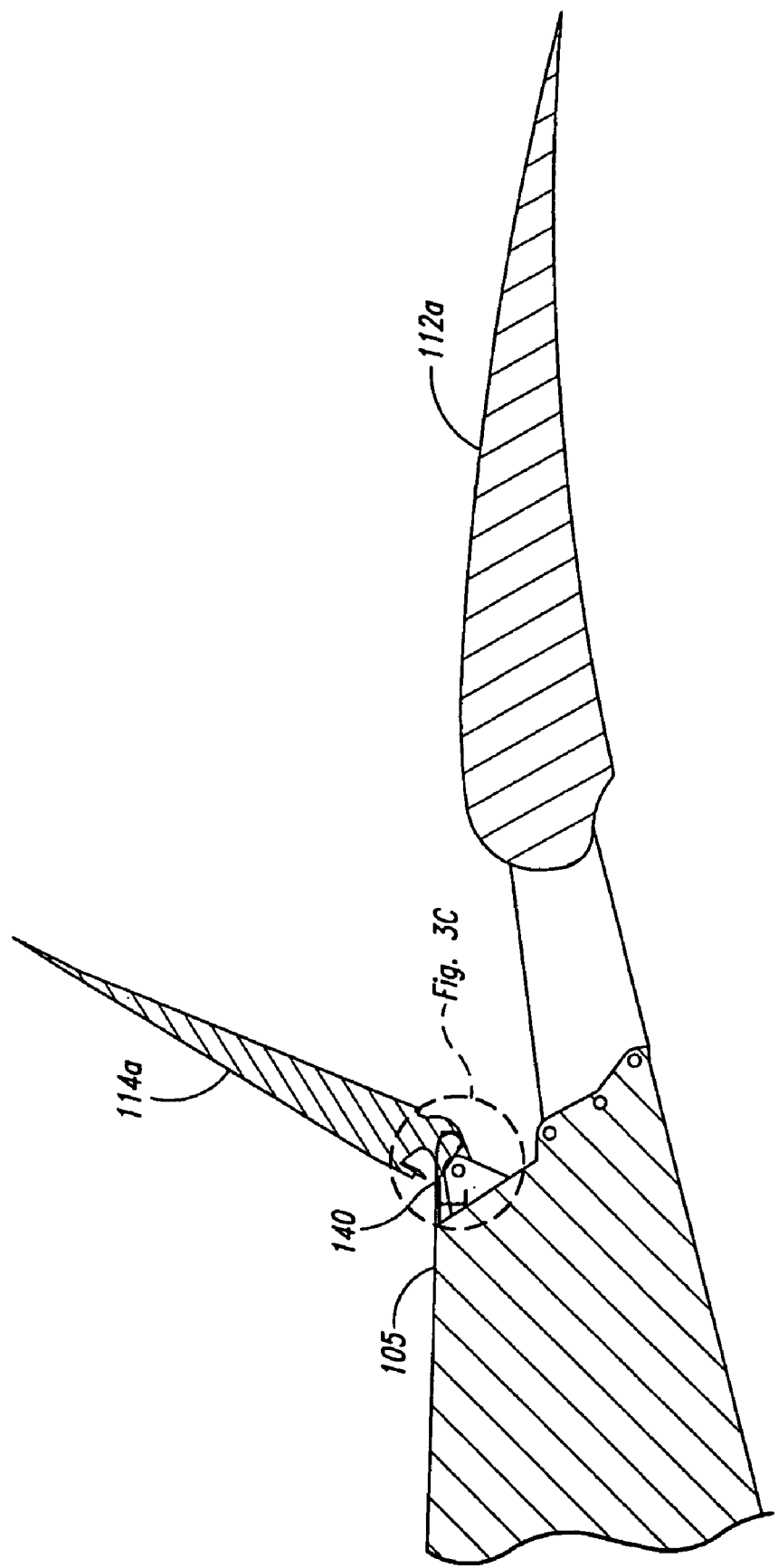

SEAL ASSEMBLIES FOR USE WITH DROOPED SPOILERS AND OTHER CONTROL SURFACES ON AIRCRAFT

TECHNICAL FIELD

The following disclosure relates generally to seals for use with aircraft control surfaces.

BACKGROUND

Conventional jet transport aircraft typically include movable control surfaces on both the leading and trailing edges of the wing. Common leading edge devices include slats and flaps, and common trailing edge devices include flaps, spoilers, and ailerons. Slats, flaps, and spoilers are typically used for aircraft control during slow flight (e.g., during take-off and landing), while ailerons provide roll control during all phases of flight.

Gaps between trailing edge control surfaces and the wing can cause aerodynamic drag that reduces aircraft performance. In commercial aircraft, the reduction in performance can equate to a significant increase in fuel consumption over the life of the aircraft. One conventional approach for sealing these gaps is to install a piece of fabric between the trailing edge of the wing and the leading edge of the control surface.

One drawback of conventional fabric seals, however, is that the fabric material is generally so compliant that it tends to flutter as the control surface moves relative to the wing. This flutter causes aerodynamic drag that can reduce aircraft performance. Another drawback of this approach is that conventional fabric seals are generally too flexible to form a smooth transition between the wing and the control surface at various control surface positions. Abrupt transitions on the wing surface can also cause unwanted aerodynamic drag. A further drawback of conventional fabric seals is that they tend to wear rapidly. As a result, they must be inspected and/or replaced frequently.

SUMMARY

This summary is provided for the benefit of the reader only, and is not intended to limit the invention as set forth by the claims.

The present invention is directed generally toward seal assemblies for use with movable control surfaces on aircraft. Such control surfaces can include, for example, spoilers, flaps, ailerons, flaperons, elevators, elevons, rudders, ruddervators, etc. A seal assembly configured in accordance with one aspect of the invention includes a first seal member and a second seal member. The first seal member has a first proximal portion and a first distal portion. The first proximal portion is configured to be fixedly attached to a fixed airfoil portion of an aircraft, and the first distal portion is configured to extend outwardly from the fixed airfoil portion toward a movable control surface. The second seal member has a second proximal portion and a second distal portion. The second proximal portion is configured to be fixedly attached to the movable control surface, and the second distal portion is configured to extend outwardly from the movable control surface toward the fixed airfoil portion. The second distal portion is also configured to movably contact the first distal portion of the first seal member to at least partially seal the gap between the fixed airfoil portion and the movable control surface as the control surface moves relative to the fixed airfoil portion. In one embodiment, the seal assembly can further include a damper configured to dampen vibration of the first distal portion of the first seal member.

Another aspect of the invention is directed to a method for sealing a gap between a movable control surface and a fixed airfoil portion of an aircraft. The method includes fixedly attaching a first proximal portion of a first seal member to the fixed airfoil portion so that a first distal portion of the first seal member extends outwardly toward the movable control surface. The method further includes pressing against the first distal portion of the first seal member with a second distal portion of a second seal member, and fixedly attaching a second proximal portion of the second seal member to the movable control surface. In one embodiment, the method can additionally include fixedly attaching a damper support to the fixed airfoil portion, and positioning a damper between the damper support and the first distal portion of the first seal member to dampen vibration of the first distal portion.

BRIEF DESCRIPTION OF THE DRAWINGS

FIGS. 2A-2C are a series of cross-sectional side views illustrating operation of the seal assembly of FIG. 1 in accordance with an embodiment of the invention.

DETAILED DESCRIPTION

The following disclosure describes methods and systems for sealing gaps between various types of movable structures and fixed structures on aircraft exteriors. Such gaps can include, for example, gaps between various types of control surfaces and adjacent structures, and gaps between landing gear doors, cabin doors, and other movable panels and adjacent structures. Certain details are set forth in the following description to provide a thorough understanding of various embodiments of the invention. Other details describing well-known structures and systems often associated with aircraft and aircraft control surfaces, however, are not set forth below to avoid unnecessarily obscuring the description of the various embodiments of the invention.

Many of the details, dimensions, angles and other features shown in the Figures are merely illustrative of particular embodiments of the invention. Accordingly, other embodiments can have other details, dimensions, angles and features without departing from the spirit or scope of the present invention. Furthermore, additional embodiments of the invention can be practiced without several of the details described below.

In the Figures, identical reference numbers identify identical or at least generally similar elements. To facilitate the discussion of any particular element, the most significant digit or digits of any reference number refer to the Figure in which that element is first introduced. For example, element 110 is first introduced and discussed with reference to FIG. 1.

Figure 1:
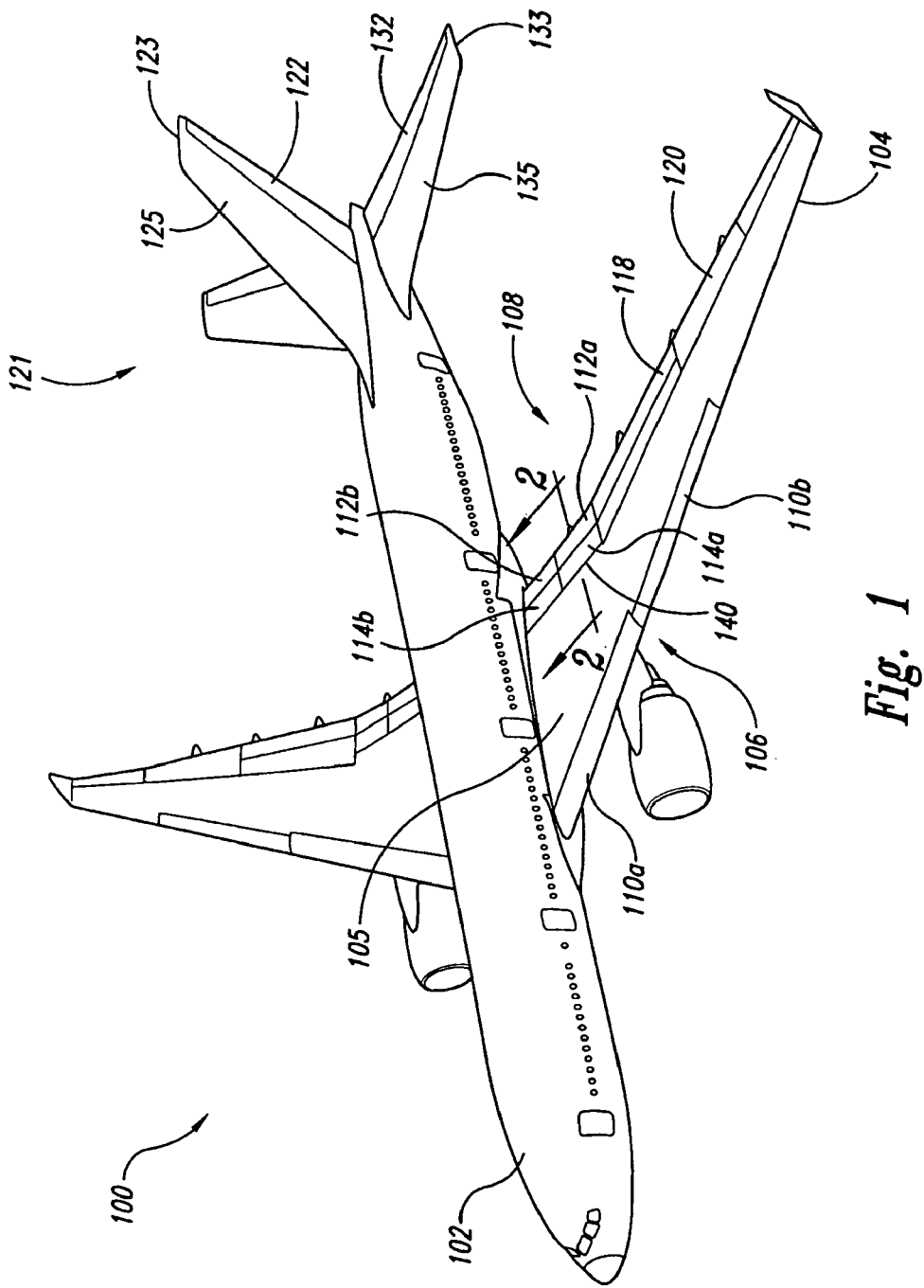
FIG. 1 is an isometric view of an aircraft having a control surface seal assembly configured in accordance with an embodiment of the invention.

FIG. 1 is an isometric view of an aircraft 100 having a control surface seal assembly 140 configured in accordance with an embodiment of the invention. In one aspect of this embodiment, the aircraft 100 includes a wing assembly 104 extending outwardly from a fuselage 102. The wing assembly 104 includes a fixed airfoil portion 105 having a leading edge region 106 and a trailing edge region 108. For ease of reference, the fixed airfoil portion 105 is referred to herein as a "fixed wing portion 105." The wing assembly 104 further includes a plurality of leading edge devices operably coupled to the leading edge region 106, and a plurality of trailing edge devices operably coupled to the trailing edge region 108. In the illustrated embodiment, the leading edge devices include a plurality of leading edge flaps 110 (identified individually as a first leading edge flap 110a and a second leading edge flap 110b). The trailing edge devices of this embodiment include a plurality of trailing edge flaps 112 (identified individually as a first trailing edge flap 112a and a second trailing edge flap 112b), a plurality of spoilers 114 (identified individually as a first spoiler 114a and a second spoiler 114b), a flaperon 118, and an aileron 120.

In another aspect of this embodiment, the aircraft 100 further includes a rudder assembly 123 and an elevator assembly 133 positioned toward an aft portion of the fuselage 102. The rudder assembly 123 includes a movable rudder 122 operably coupled to a fixed airfoil portion or vertical stabilizer 125. The elevator assembly 133 includes a movable elevator 132 operably coupled to a fixed airfoil portion or horizontal stabilizer 135. In other embodiments, the aircraft 100 can include other fixed airfoil portions and other movable control surfaces that differ from those described above.

Figure 2A:
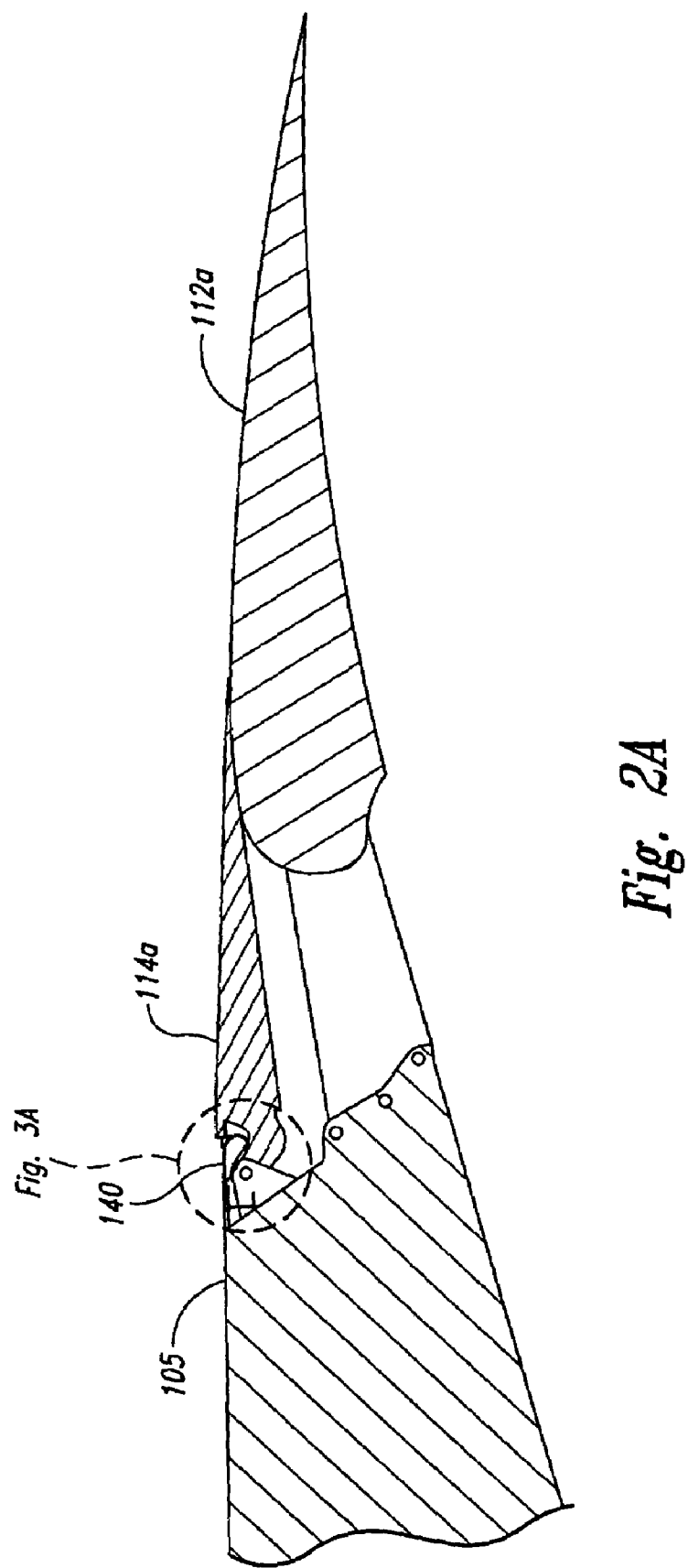

FIGS. 2A-2C are a series of cross-sectional views taken along line 2-2 in FIG. 1 showing the spoiler 114a and the flap 112a in a variety of different positions corresponding to different flight modes. FIG. 2A, for example, illustrates the spoiler 114a and the flap 112a in retracted positions for cruise flight. In this mode, the seal assembly 140 covers, or at least substantially covers, the gap between the fixed wing portion 105 and the spoiler 114a to reduce aerodynamic drag.

In FIG. 2B, the spoiler 114a and the flap 112a are drooped to provide high lift during low-speed flight (e.g., during takeoff and landing). In this mode, the seal assembly 140 maintains the seal between the fixed wing portion 105 and the spoiler 114a to assist the low drag/high lift configuration of the aircraft 100 (FIG. 1). In addition, as described in greater detail below, when the spoiler 114a is in the drooped position the seal assembly 140 forms a generous radius that transitions smoothly between the fixed wing portion 105 and the spoiler 114a. The smooth transition is less conducive to flow separation and the associated drag that results from sharp transitions surface contours.

FIG. 2C illustrates the spoiler 114a in an upward position for aero-braking or maneuvering. Sealing the gap between the fixed wing portion 105 and the spoiler 114a is less important in these flight regimes because the additional drag increment is not detrimental to aircraft performance. In fact, the additional drag can increase the braking effect of the spoiler 114a. For this reason, the seal assembly 140 forms a gap between the fixed wing portion 105 and the spoiler 114a when the spoiler 114a is in the upward position. By disengaging, the seal assembly 140 provides the additional benefit of allowing the spoiler 114a to move upward quickly if rapid braking is needed.

Figure 3A:
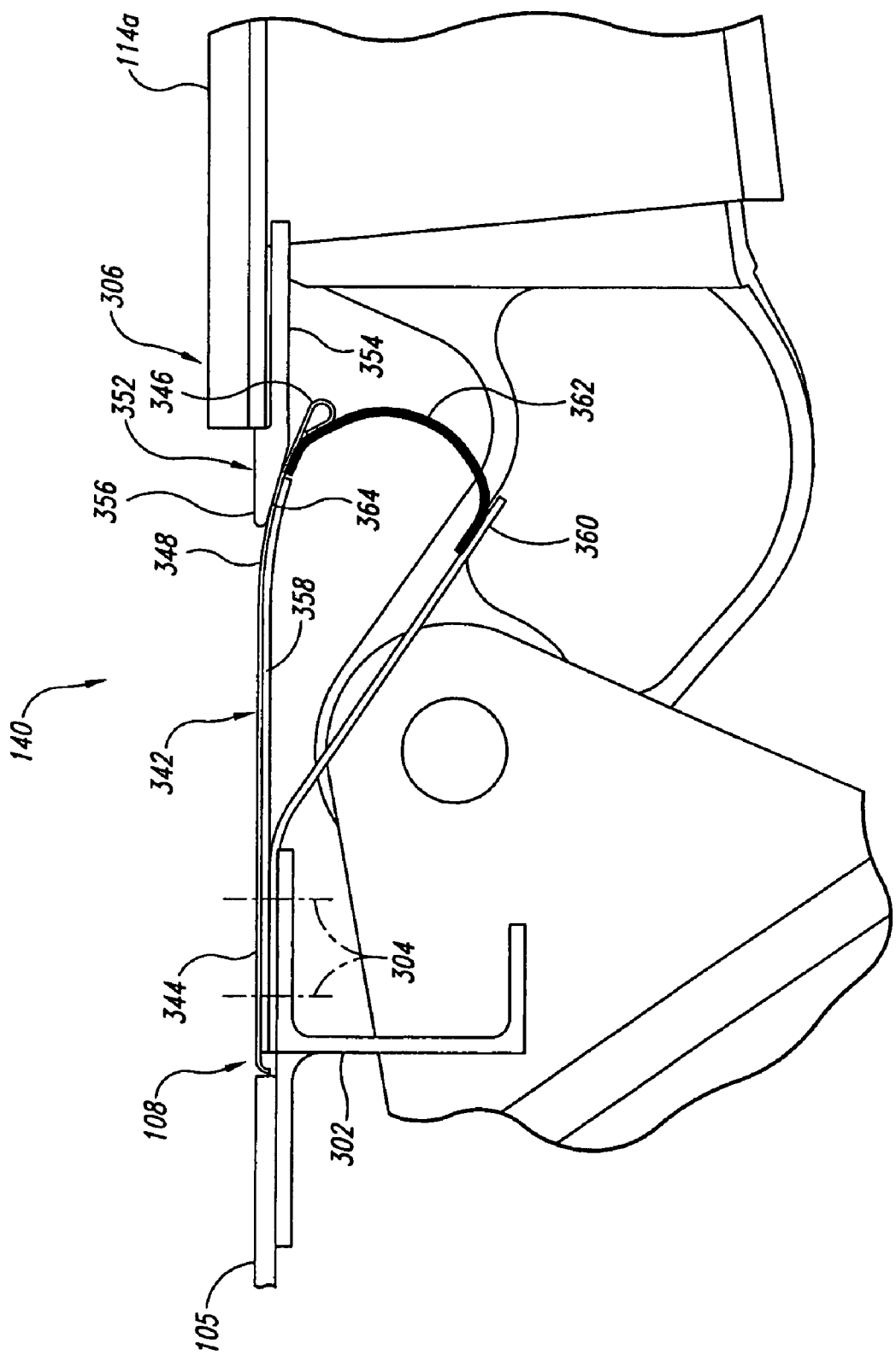
FIGS. 3A-3C are a series of enlarged side views illustrating various details of the seal assembly of FIGS. 1-2C.
Figure 3B:
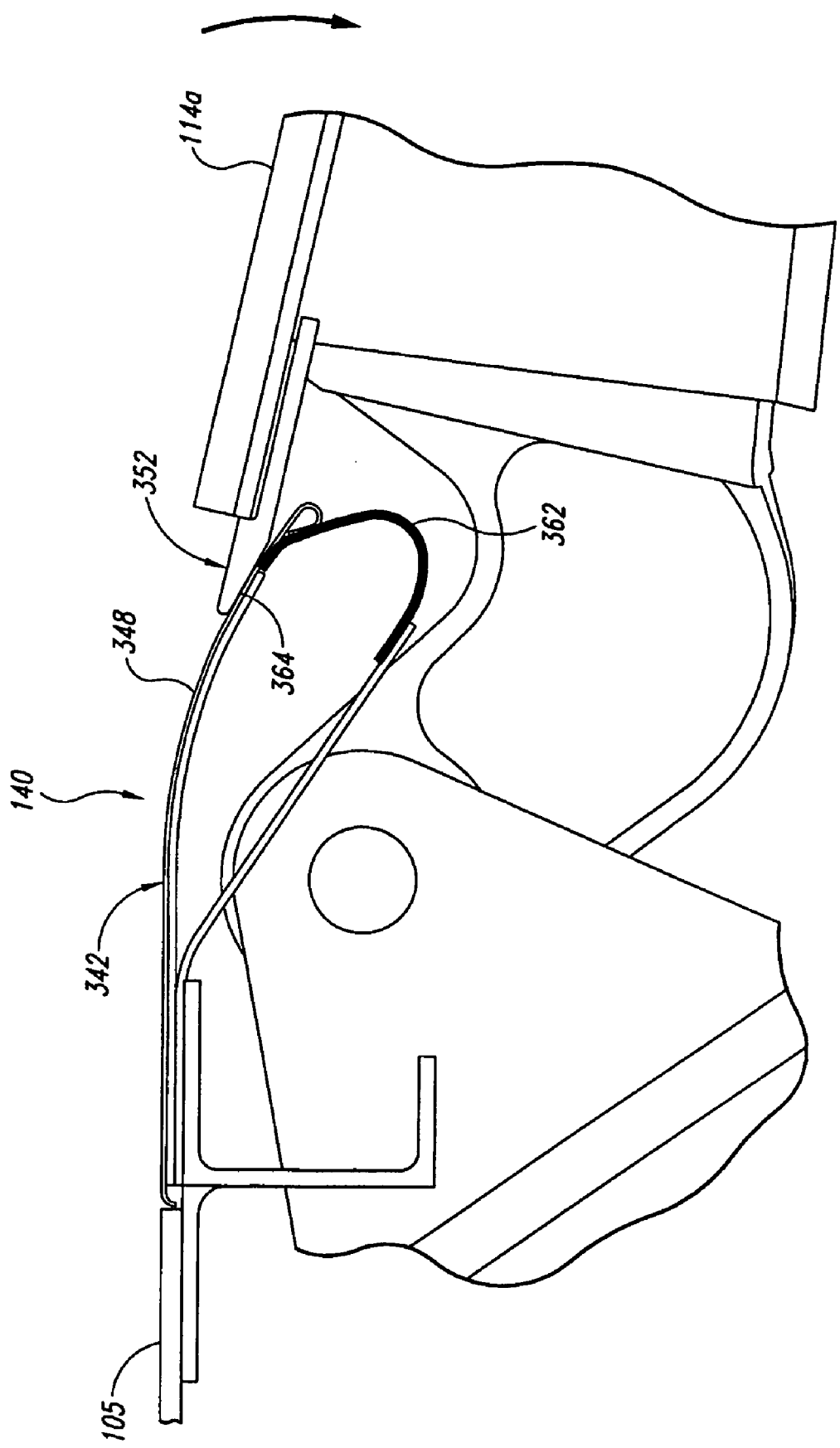
Figure 3C:
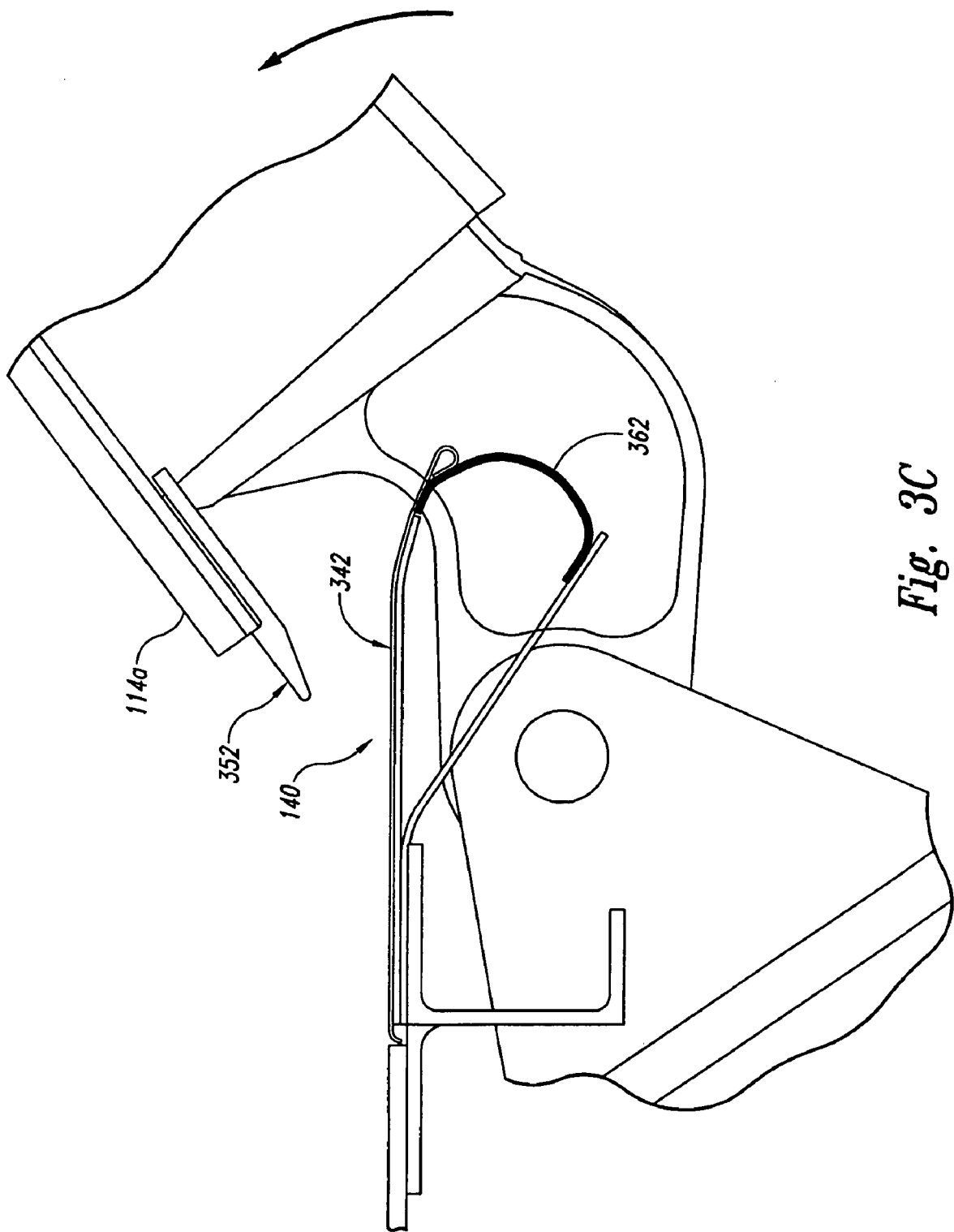

FIGS. 3A-3C are a series of enlarged side views taken from FIGS. 2A-2C, respectively. Referring first to FIG. 3A, in one aspect of this embodiment, the seal assembly 140 includes a first seal member 342 and a second seal member 352. The first seal member 342 includes a first proximal portion 344 and a first distal portion 346. The first proximal portion 344 is fixedly attached to the trailing edge region 108 of the fixed wing portion 105, and the first distal portion 346 extends outwardly from the trailing edge region 108 toward the spoiler 114a. In the illustrated embodiment, the first proximal portion 344 is fixedly attached to a wing edge member 302 with a plurality of removable fasteners 304. In other embodiments, however, the first proximal portion 344 can be fixedly attached to the edge member 302 with other means including, for example, permanent fasteners, adhesives, etc. In yet further embodiments, the first proximal portion 344 can be an integral part of the edge member 302 and/or the wing trailing edge region 108.

The second seal member 352 includes a second proximal portion 354 and a second distal portion 356. In the illustrated embodiment, the second proximal portion 354 is adhesively bonded to a spoiler leading edge region 306. In other embodiments, however, the second proximal portion 354 can be fixedly attached to the spoiler leading edge region 306 with other means including, for example, permanent fasteners, removable fasteners, etc. In further embodiments, the second seal member 352 can be omitted and the function of this feature can be performed by an integral portion of the spoiler leading edge region 306.

The second distal portion 356 of the second seal member 352 extends outwardly from the spoiler leading edge region 306 and presses against the first distal portion 346 of the first seal member 342. As described in greater detail below, the second distal portion 356 movably contacts the first distal portion 346 as the spoiler 114a moves relative to the fixed wing portion 105. In this way, the first seal member 342 and the second seal member 352 together form a seal that at least partially covers the gap between the spoiler 114a and the fixed wing portion 105 as the spoiler 114a moves from the cruise position of FIG. 2A to the drooped position of FIG. 2B.

The seal assembly 140 can further include a damper 362 that extends between a damper support 360 and the first distal portion 346 of the first seal member 342. In the illustrated embodiment, one end of the damper support 360 is sandwiched between the first seal member 342 and the edge member 302, and the other end extends outwardly toward the spoiler 114a. The damper support 360 can be made from various types of metal, fiber-reinforced resin, and/or other relatively stiff materials suitable for holding the damper 362 in position.

In the illustrated embodiment, the damper 362 is made from an elastic material (e.g., a synthetic rubber material such as neoprene) that allows the first seal member 342 to flex with minimal resistance while providing passive damping to a wide range of vibration modes that may be present when the spoiler 114a is deployed upward as shown in FIG. 2C. In other embodiments, the damper 362 can be made from other materials and can have other configurations. For example, in other embodiments, the damper 362 can include compressible foams, metallic springs, and/or hydraulic cylinders. In still further embodiments, the damper 362 can be omitted. Accordingly, the various embodiments of the present invention are not limited to the particular damping system described in FIG. 3A.

The first seal member 342 can include a resilient layer 348 which overlays a base layer 358. In the illustrated embodiment, the resilient layer 348 includes stainless steel with sufficient elasticity to (1) maintain spring-pressure against the second distal portion 356 of the second seal member 352 when the spoiler 114a is in the cruise position shown in FIG. 3A, and (2) deflect inward and form a generous radius when the spoiler 114a is drooped to the position shown in FIG. 3B. In other embodiments, the resilient layer 348 can include other metallic and non-metallic materials of sufficient elasticity. Such materials can include, for example, fiber-reinforced resins, plastics, high-strength metal alloys, etc. The base layer 358 can be made from rubber, plastic, and/or other materials suitable for absorbing vibration of the first seal member 342. In other embodiments, however, the base layer 358 can be omitted.

In a further aspect of this embodiment, the second seal member 352 can be formed from a relatively hard and/or stiff material. For example, in the illustrated embodiment, the second seal member 352 is formed from Delrin® or another suitable plastic material having a beveled contact surface 364 which can slide over the resilient layer 348 of the first seal member 342 as the spoiler 114a moves relative to the fixed wing portion 105. In other embodiments, the second seal member 352 can be made from other materials including, for example, fiber-reinforced resin materials and metals. In a further embodiment mentioned above, the second seal member 352 can be omitted and replaced by an appropriately-configured portion of the spoiler leading edge region 306.

Referring next to FIG. 3B, this view illustrates operation of the seal assembly 140 when the spoiler 114a is in the drooped position of FIG. 2B. As the spoiler 114a moves into this position, the contact surface 364 of the second seal member 352 slides across the outer surface of the resilient layer 348 and deflects the first seal member 342 inwardly in a generous radius. As discussed above, the generous radius reduces flow separation and drag over the seal assembly 140 while maintaining a seal between the spoiler 114a and the fixed wing portion 105. As further illustrated in FIG. 3B, the flexible damper 362 conforms to the deflected position of the first seal member 342.

Referring next to FIG. 3C, this view illustrates operation of the seal assembly 140 when the spoiler 114a is rotated upwardly to the position shown in FIG. 2C. Here, the second seal member 352 moves upwardly and away from the first seal member 342 to open a gap between the two seal members. This gap is not detrimental to aircraft performance in the spoiler-up configuration because the additional aerodynamic drag caused by the gap increases the desired braking effect. When the spoiler 114a is deployed upward, however, the air flow in close proximity to the seal assembly 140 is in a separated state which could buffet the first seal member 342 and produce unwanted vibration. To counter this, the damper 362 is configured to provide passive damping to a wide range of vibration modes that may be present when the spoilers are deployed upwards.

One feature of the embodiment of the seal assembly 140 described above with reference to FIGS. 2A-3C is that it provides an effective seal between the fixed wing portion 105 and the spoiler 114a when the spoiler 114a is in the cruise and drooped positions. An advantage of this feature is that it reduces drag (e.g., excrescence drag) when the spoiler 114a is in these positions. Another feature of this embodiment is that the resilient layer 348 of the first seal member 342 provides a relatively hard and smooth surface for the second seal member 352 to slide on. One advantage of this feature is that it reduces friction and provides a long-lasting interface between the two seal members. Another advantage of this feature is that it provides a relatively durable surface that can resist damage due to hail, ultraviolet light, tool drops, etc. Both of these advantages reduce operating costs. Additional advantages of the seal configuration described above are that it is relatively inexpensive, easy to install, easy to remove, visually appealing, and very durable.

Although FIGS. 2A-3C illustrate one embodiment of a seal assembly configured in accordance with the present invention, in other embodiments, seal assemblies configured in accordance with the present invention may differ somewhat from the embodiment of FIGS. 2A-3C. For example, in other embodiments, seal assemblies at least generally similar in structure and function to the seal assembly 140 can be used with other types of control surfaces. For example, referring to FIG. 1, in another embodiment a seal assembly similar to the seal assembly 140 can be used between the aileron 120 and the fixed wing portion 105. In another embodiment, a similar seal assembly can be used between the rudder 122 and the vertical stabilizer 125, or between the elevator 132 and the horizontal stabilizer 135.

Although certain materials have been identified above, in other embodiments, various portions of the seal assembly 140 can be constructed from other materials. Furthermore, although the first seal member 342 is attached to the fixed wing portion 105 in the embodiments of the seal assembly 140 described above, in other embodiments the first seal member 342 can be attached to the spoiler 114a and the second seal member 352 can be attached to the fixed wing portion 105. In yet other embodiments, the second seal member 352 can be omitted and the function performed by this feature can be incorporated into the leading edge region of the movable control surface (or, conversely, into the leading edge region of the fixed airfoil portion).

From the foregoing, it will be appreciated that specific embodiments of the invention have been described herein for purposes of illustration, but that various modifications may be made without deviating from the spirit and scope of the invention. For example, aspects of the invention described in the context of particular embodiments may be combined or eliminated in other embodiments. Further, while advantages associated with certain embodiments of the invention have been described in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A seal assembly for use with an aircraft, the aircraft having a movable control surface spaced apart from a fixed airfoil portion to define a gap therebetween, the seal assembly comprising:

a first seal member having a first proximal portion and a first distal portion, wherein the first proximal portion is fixedly attached to the fixed airfoil portion and the first distal portion extends outwardly from the fixed airfoil portion toward the movable control surface; and a second seal member having a second proximal portion and a second distal portion, wherein the second proximal portion is fixedly attached to the movable control surface and the second distal portion extends outwardly from the movable control surface toward the fixed airfoil portion, and wherein the second distal portion movably contacts the first distal portion of the first seal member to cover the gap between the fixed airfoil portion and the movable control surface as the movable control surface moves relative to the fixed airfoil portion;

wherein the second distal portion of the second seal member presses against the first distal portion of the first seal member and deflects the first seal member changing a radius thereof as the movable control surface rotates in a first direction; and wherein the second distal portion separates from the first distal portion when the movable control surface rotates in a second direction opposite to the first direction.

2. The seal assembly of claim 1 wherein the second distal portion of the second seal member is configured to press against the first distal portion of the first seal member and deflect the first seal member as the movable control surface moves relative to the fixed airfoil portion.

3. The seal assembly of claim 1 wherein the first distal portion of the first seal member is configured to press against the second distal portion of the second seal member and deflect the second seal member as the movable control surface moves relative to the fixed airfoil portion.

4. The seal assembly of claim 1 wherein the movable control surface includes a spoiler and the fixed airfoil portion includes a fixed wing portion, wherein the second distal portion of the second seal member is configured to press against the first distal portion of the first seal member as the spoiler rotates downwardly relative to the fixed wing portion, and wherein the second distal portion is configured to separate from the first distal portion when the spoiler rotates upwardly relative to the fixed wing portion.

5. The seal assembly of claim 1, further comprising a vibration damper configured to be operably coupled to the first distal portion of the first seal member.

6. The seal assembly of claim 1 wherein the movable control surface includes a spoiler and the fixed airfoil portion includes a fixed wing portion, wherein the first seal member includes a resilient metal outer layer and the second seal member includes a stiff plastic inner surface configured slide across the resilient metal outer layer, and wherein the seal assembly further comprises:
  a damper support configured to be fixedly attached to the fixed wing portion; and
  a vibration damper configured to be operably coupled to the first distal portion of the first seal member and carried by the damper support.

7. A seal assembly for use with an aircraft, the aircraft having a movable control surface spaced apart from a fixed airfoil portion to define a gap therebetween, the seal assembly comprising:
  a first seal member having a first proximal portion and a first distal portion, wherein the first proximal portion is fixedly attached to the fixed airfoil portion and the first distal portion extends outwardly from the fixed airfoil portion toward the movable control surface; and
  a second seal member having a second proximal portion and a second distal portion, wherein the second proximal portion is fixedly attached to the movable control surface and the second distal portion extends outwardly from the movable control surface toward the fixed airfoil portion, and wherein the second distal portion moveably contacts the first distal portion of the first seal member to at least partially cover the gap between the first airfoil portion and the movable control surface as the movable control surface rotates downwardly relative to the fixed airfoil portion;
  wherein the gap is uncovered between the movable control surface and the fixed airfoil portion as the movable control surface rotates upwardly relative to the fixed airfoil portion;
  wherein the first distal portion includes an outer-facing surface and the second distal portion includes an inner-facing surface, and wherein the inner-facing surface is configured to slide across the outer-facing surface as the movable control surface moves relative to the fixed airfoil portion.

8. The seal assembly of claim 7 wherein the first seal member is formed from a resilient material and the second seal member is formed from a stiff material that is different than the resilient material.

9. The seal assembly of claim 7 wherein the first seal member is formed from a resilient metal and the second seal member is formed from a stiff plastic.

10. The seal assembly of claim 1 wherein the first distal portion includes a first surface and the second distal portion includes a second surface, and wherein the second surface is configured to slide across the first surface as the movable control surface moves relative to the fixed airfoil portion.

11. A seal assembly for use with an aircraft, the aircraft having a movable control surface spaced apart from a fixed airfoil portion to define a gap therebetween, the seal assembly comprising:
  a first seal member having a first proximal portion and a first distal portion, wherein the first proximal portion is fixedly attached to the fixed airfoil portion and the first distal portion extends outwardly from the fixed airfoil portion toward the movable control surface;
  a second seal member having a second proximal portion and a second distal portion, wherein the second proximal portion is fixedly attached to the movable control surface and the second distal portion extends outwardly from the movable control surface toward the fixed airfoil portion, and wherein the second distal portion movably contacts the first distal portion of the first seal member to cover the gap between the fixed airfoil portion and the movable control surface as the movable control surface moves relative to the fixed airfoil portion;
  a damper support fixedly attached to the fixed airfoil portion; and
  a vibration damper directly attached to the first distal portion of the first seal member and carried by the damper support.

12. A Method for sealing a gap between a movable control surface and a fixed airfoil portion on an aircraft, the method comprising:
  fixedly attaching a first proximal portion of a first seal member to the fixed airfoil portion, whereby a first distal portion of the first seal member extends outwardly from the fixed airfoil portion toward the movable control surface;
  pressing inwardly against the first distal portion of the first seal member with a second distal portion of a second seal member;
  fixedly attaching a second proximal portion of the second seal member to the movable control surface;
  fixedly attaching a damper support to the fixed airfoil portion; and
  positioning a motion damper between the damper support and the first distal portion of the first seal member.

13. The method of claim 12 wherein pressing inwardly against the first distal portion of the first seal member includes pressing inwardly against a resilient metal layer to deflect the resilient metal layer.

14. The method of claim 12 wherein fixedly attaching a first proximal portion of a first seal member to the fixed airfoil portion includes fixedly attaching a piece of stainless steel to a trailing edge region of a wing.

15. The method of claim 12 wherein fixedly attaching a first proximal portion of a first seal member to the fixed airfoil portion includes fixedly attaching a resilient piece of stainless steel to a trailing edge region of a wing, and wherein fixedly attaching a second proximal portion of the second seal member to the movable control surface includes fixedly attaching a stiff piece of plastic to a leading edge region of a wing spoiler.

16. The method of claim 12 wherein fixedly attaching a first proximal portion of a first seal member to the fixed airfoil portion includes fixedly attaching a resilient piece of stainless steel to a trailing edge region of a wing, wherein fixedly attaching a second proximal portion of the second seal member to the movable control surface includes fixedly attaching a stiff piece of plastic to a leading edge region of a wing spoiler, and wherein pressing inwardly against the first distal portion of the first seal member with a second distal portion of a second seal member includes pressing inwardly against the stainless steel with the stiff piece of plastic.

17. An aircraft having a system for sealing a gap between a spoiler and a fixed wing portion, the system comprising:
   first seal means fixedly attached to the fixed wing portion;
   second seal means fixedly attached to the spoiler; and
   means for pressing a first distal portion of the first seal means against a second distal portion of the second seal means to maintain contact between the first and second seal means and at least partially cover the gap as the spoiler rotates downwardly relative to the fixed wing portion, wherein the system further comprises means for uncovering the gap between the spoiler and the fixed wing portion as the spoiler rotates upwardly relative to the fixed wing portion, and
   means for dampening vibrations of the first seal means.

18. A seal assembly for use with an aircraft, the aircraft having a movable control surface spaced apart from a fixed airfoil portion to define a gap therebetween, the seal assembly comprising:
   a first seal member formed from resilient material, the first seal member having a first proximal portion and a first distal portion, wherein the first proximal portion is fixedly attached to the fixed airfoil portion, wherein the first distal portion extends outwardly from the fixed airfoil portion toward the movable control surface, and wherein the first distal portion includes an outer-facing surface;
   a second seal member formed from stiff material that is different than the resilient material, the second seal member having a second proximal portion and a second distal portion, wherein the second proximal portion is fixedly attached to the movable control surface, wherein the second distal portion includes an inner-facing surface that presses against the outer-facing surface of the first distal portion and deflects the first seal member into a decreased radius as the movable control surface rotates downwardly relative to the fixed airfoil portion, and wherein the second distal portion separates from the first distal portion to form a gap therebetween when the movable control surface rotates upwardly relative to the fixed airfoil portion;
   a damper support fixedly attached to the fixed airfoil portion; and
   a vibration damper carried by the damper support and operably coupled to the first distal portion of the first seal member.

* * * * *

UNITED STATES PATENT AND TRADEMARK OFFICE
CERTIFICATE OF CORRECTION

PATENT NO. : 7,611,099 B2
APPLICATION NO. : 11/220446
DATED : November 3, 2009
INVENTOR(S) : Jan A. Kordel et al.

It is certified that error appears in the above-identified patent and that said Letters Patent is hereby corrected as shown below:

Title page 3, in column 2, under "Other Publications", line 27, delete "Aeornautics" and insert -- Aeronautics --, therefor.

In column 8, line 27, in claim 12, delete "Method" and insert -- method --, therefor.

In column 9, line 16, in claim 17, delete "portion," and insert -- portion; --, therefor.

Signed and Sealed this

Twentieth Day of July, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,611,099 B2 | Page 1 of 1 |
| APPLICATION NO. | : 11/220446 | |
| DATED | : November 3, 2009 | |
| INVENTOR(S) | : Kordel et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 864 days.

Signed and Sealed this

Twelfth Day of October, 2010

David J. Kappos
*Director of the United States Patent and Trademark Office*